July 5, 1960
W. F. BARKER
2,943,577
PUMP
Filed Sept. 16, 1957
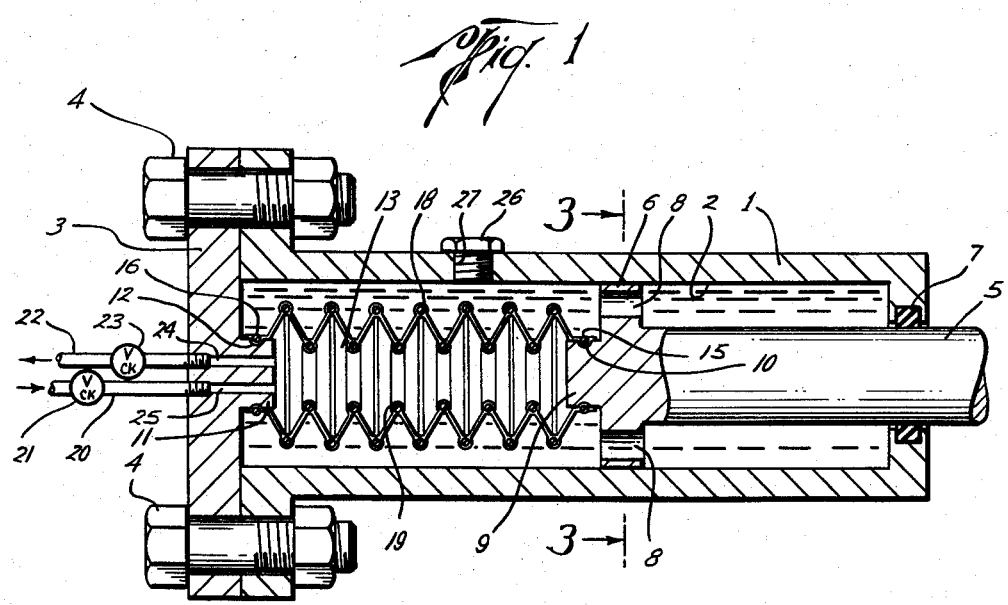
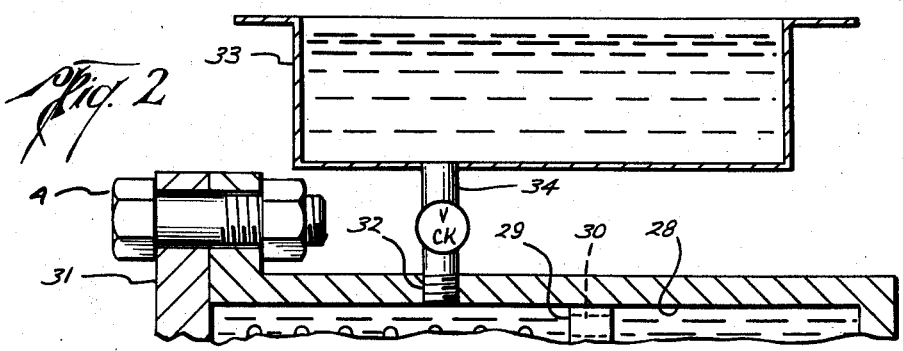
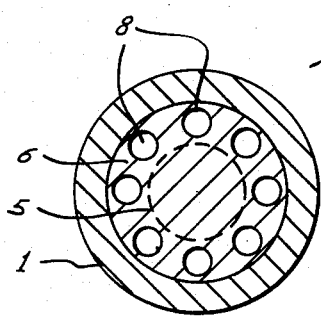
Woodrow F. Barker
INVENTOR.
BY Ransells O. Wyatt
ATTORNEY

United States Patent Office 2,943,577
Patented July 5, 1960

2,943,577
PUMP
Woodrow F. Barker, 8402 Bluegate, Houston, Tex.
Filed Sept. 16, 1957, Ser. No. 684,157
6 Claims. (Cl. 103—148)

This invention relates to new and useful improvements in a pump.

It is an object of this invention to provide a pump of novel design for use in pipe lines and the like where piston type pumps are presently employed.

It is another object of the invention to provide a piston type pump having means for utilizing a flexible bellows in the cylinder of a pump to greatly reduce the necessity of replacing pistons and rings.

It is another object of the invention to provide a pump having a piston and cylinder and having means for constantly lubricating the piston and at all times separating the cylinder walls and piston from the fluid being pumped.

It is still a further object of the invention to provide a piston type pump having a flexible bellows in the cylinder and having novel means for balancing the outside and inside pressure on the bellows during pumping operations.

In the petroleum industry pipe lines are employed extensively and many kinds of fluids are pumped containing sand, grit and other types of ingredients that are harmful to the pump cylinder and pump piston, causing rapid wear of piston rings and necessitating expensive and time consuming repairs. It is an object of this invention to provide a means for pumping such fluids without subjecting the pump cylinder or piston to contact with the fluid being pumped and minimizing the maintenance and repair costs.

With the above and other objects in view, the invention has relation to certain novel features of construction, operation and arrangement of parts more particularly described in the following specification and illustrated in the accompanying drawings, wherein:

Figure 1 is a side elevational view of the pump, in cross section.

Figure 2 is a side elevational view of the pump, in cross section, showing an oil reservoir attached, and Figure 3 is an end view of the piston in cross section, taken on the line 3—3 of Figure 1.

Referring now more particularly to the drawings, the numeral 1 designates a pump cylinder housing having the cylinder 2 and the usual cylinder head 3 secured to the cylinder housing by means of the bolts 4, 4. The usual piston rod 5 having the piston 6 is mounted in the cylinder 2 through a suitable gland 7. The piston 6 has a plurality of transverse ports 8, 8 of any desired size, in annular alignment around the piston. On the face of the piston 6 is an axial projection 9 which has an annular groove 10. On the inner face of the cylinder head 3 is a similar axial projection 11 having the annular groove 12. A bellows 13 of suitable flexible material, is secured at one end by the snap ring 15 over the end opening of the bellows and fitted into the groove 10, and the snap ring 16, over the other end opening of the bellows and fitted into the groove 12. Suitable reinforcing rings as 18, 19 may be employed in the bellows 13 to provide a rigidity to the bellows.

An inlet line 20 having a suitable check valve 21 and an outlet line 22 having a suitable check valve 23, are mounted in the head 3, by connection into the internally threaded ports 24, 25 that extend through the head 3 and lead into the bellows 13.

A filler plug 26 is mounted in the cylinder wall in a threaded port 27 that leads into the cylinder 2. Oil of the desired weight is poured through the port 27, filling the cylinder around the bellows 13 and flowing through the ports 8, filling the rest of the cylinder.

In operation, the piston 6 moves rearwardly, drawing the fluid to be pumped into the bellows 13, through the line 20. As the piston 6 moves towards the cylinder head, the fluid in the bellows is forced outwardly and the combined volume of oil in the cylinder on both sides of the piston remains constant because the mean cross sectional area of the bellows is exactly equal to the cross sectional area of the rod. The mean cross sectional diameter of the bellows is equal to the cross sectional diameter of the piston rod. During the pressure stroke, the volume of oil displaced outside the bellows is exactly equal to the void on the rod side of the piston. The volume of oil will flow through the passages in the piston to fill the void. The volume of material displaced inside the bellows will be forced out through the ports in the cylinder head. The oil in the cylinder being of the same weight as the fluid being pumped will maintain a pressure against the bellows equal to the pressure of fluid being pumped. This limits the pressure capacity of the pump only to the extent of the physical structure of the pump. Where sandy or gritty fluids are being pumped no damage will result to the piston, packing glands or cylinder and any damage or wear on the bellows may be readily and easily repaired and the pump deactivated for a minimum time, by replacing the bellows which is accomplished by removing the cylinder head and snap rings 15, 16 and affixing a new bellows on the piston and head.

In the form shown in Figure 2, a cylinder 28 is provided with a piston 29 having transverse ports 30 and a cylinder head 31 and in the internally threaded port 32 is mounted an oil reservoir 33 and in the line 34 leading from the reservoir 33 to the cylinder 28 is a check valve permitting filling of the cylinder 28 upon rearward movement of the piston, when the oil in the reservoir leaks out, so that the cylinder will remain filled with oil at all times.

The bellows 13 may be of any desired flexible material, and where corrosive or acid bearing fluids are being pumped, the bellows may be constructed of acid resisting material, such as rubber impregnated fabric.

While the size of the bellows is a matter of choice, the main cross sectional area of the bellows will be the same as the cross sectional area of the piston rod.

While the foregoing is considered a preferred form of the invention, it is by way of illustration only, the broad principle of the invention being defined by the appended claims.

What I claim is:

1. In a pump, a cylinder having a cylinder head, a reciprocating piston in the cylinder abutting the cylinder wall, a reciprocating piston rod connected at one end to said piston and extending through one end of said cylinder, flexible bellows of the same mean cross sectional diameter as the cross sectional diameter of the rod secured at one end to the piston and at the other end to the cylinder head, passageways through said piston, and an inlet and outlet passageway through said cylinder head into said bellows.

2. In a pump, an oil filled cylinder having a cylinder head, a reciprocation piston in said cylinder in contact with the cylinder wall, a piston rod in said cylinder, said piston rod being connected at one end to said piston for reciprocation of said piston and extending through one end of said cylinder, a bellows in said cylinder having the same mean cross sectional diameter as the rod and secured at one end to said piston and at the other end to said cylinder head, said bellows having rigid reinforcing rings in each fold thereof, ports through said piston for the passage of oil therethrough while said piston reciprocates and flow passageways through said head leading into said bellows.

3. In a pump, an oil filled cylinder having a cylinder head, a reciprocating piston in said cylinder in contact with the cylinder wall, a piston rod in said cylinder secured to said piston, a bellows in said cylinder having the same mean cross sectional diameter as said rod and being secured at one end to said piston and at the other end to said cylinder head, ports through said piston for the passage of oil therethrough while said piston reciprocates and flow passageways through said head leading into said bellows, and means mounted on said cylinder and in flow connection therewith for maintaining a constant supply of oil in said cylinder of the same weight as the fluid being pumped.

4. In a pump, a cylinder and cylinder head on said cylinder having a piston reciprocally mounted therein and in contact with the cylinder wall, said piston having a piston rod secured thereto and an axial projection and an annular groove in said projection, said cylinder head having an axial projection and an annular groove in said projection, a flexible bellows mounted on said projections of the same mean cross sectional diameter as said rod and fastening means mounted on said bellows and seating in said grooves in said annular projections for securing said bellows thereon, and fluid passageways through said head into said bellows.

5. In a pump, a cylinder having a cylinder head, a piston in said cylinder in contact with the cylinder wall, said piston having a piston rod connected at one end, said piston having a series of transverse passageways therethrough, axially aligned bellows receiving means on said piston and said head, a flexible bellows of the same mean cross sectional diameter as said rod mounted on said bellows receiving means, fluid in said cylinder of the same weight as the fluid being pumped, and inlet and outports extending through said head and leading into said bellows.

6. In a pump, a cylinder having a cylinder head, a reciprocating piston mounted in said cylinder and in contact with the cylinder wall, a piston rod connected at one end to said piston, a bellows of the same mean cross sectional diameter as said piston rod mounted at one end to said piston and at the other end to said cylinder head, inlet and outlet ports through said head leading into said bellows, transverse passageways through said piston and fluid of the same weight as the fluid being pumped in and filling said cylinder and maintaining a balanced volume pressure against the side walls of said bellows with the volume pressure of the fluid being pumped.

References Cited in the file of this patent

UNITED STATES PATENTS

| | | |
|---|---|---|
| 184,461 | Cooper | Nov. 21, 1876 |
| 1,303,080 | Loraille | May 6, 1919 |
| 1,546,973 | Ellis | July 21, 1925 |
| 1,757,997 | Greenwald | May 13, 1930 |
| 2,021,156 | Smith | Nov. 19, 1935 |
| 2,191,861 | Rymal | Feb. 27, 1940 |

FOREIGN PATENTS

| | | |
|---|---|---|
| 2,185 | Great Britain | June 23, 1874 |